(12) United States Patent
Bhaskaran et al.

(10) Patent No.: US 12,532,222 B2
(45) Date of Patent: Jan. 20, 2026

(54) FLEXIBLE EXPERT SYSTEM IN RADIO ACCESS NETWORK

(71) Applicant: Rakuten Symphony, Inc., Tokyo (JP)

(72) Inventors: Sridhar Bhaskaran, Bangalore (IN); Pankaj Kumar Rathore, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 357 days.

(21) Appl. No.: 18/033,666

(22) PCT Filed: Dec. 2, 2022

(86) PCT No.: PCT/US2022/051735
§ 371 (c)(1),
(2) Date: Apr. 25, 2023

(87) PCT Pub. No.: WO2024/118084
PCT Pub. Date: Jun. 6, 2024

(65) Prior Publication Data
US 2024/0187933 A1 Jun. 6, 2024

(51) Int. Cl.
*H04W 28/16* (2009.01)
*H04W 84/04* (2009.01)

(52) U.S. Cl.
CPC .......... *H04W 28/16* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 9,497,082 B2* | 11/2016 | Cutler | H04L 41/0893 |
| 10,673,546 B2* | 6/2020 | Bedekar | H04W 24/10 |
| 10,791,481 B2 | 9/2020 | Nguyen et al. | |
| 11,013,002 B2 | 5/2021 | Lee et al. | |
| 12,022,383 B1* | 6/2024 | Balmakhtar | H04W 48/16 |
| 2006/0294219 A1* | 12/2006 | Ogawa | H04L 41/0894 709/224 |
| 2007/0150936 A1* | 6/2007 | Maes | H04L 67/10 726/1 |

(Continued)

OTHER PUBLICATIONS

ORAN.WG3.E2SM-RC-v01.01.05 (O-RAN Working Group 3 Near-Real-time RAN Intelligent Controller E2 Service Model (E2SM), RAN Control), ORAN Alliance, Jul. 2021.

*Primary Examiner* — Hassan A Phillips
*Assistant Examiner* — Gautam Sharma
(74) *Attorney, Agent, or Firm* — Myers Wolin, LLC (57) ABSTRACT

A method and a system of configuring custom operator defined rules for managing radio resources of user equipment in a wireless communication system. The system includes a plurality of User Equipment (UE), a plurality of wireless base stations configured to host Centralized Unit (CU) and Distributed Unit (DU) software, a rules engine, a first Application Programming Interface (API) wherein the rules engine is programmed with operator defined rules via the first API, and a second API coupled with the CU and DU software and configured to invoke the rules engine upon an occurrence of one or more defined events, wherein one or more of the operator defined rules is invoked via API calls to execute operator defined rules that match one or more inputs provided by at least one of the CU and DU hosted by at least one of the plurality of base stations.

19 Claims, 4 Drawing Sheets

(56) References Cited

U.S. PATENT DOCUMENTS

| | | | |
|---|---|---|---|
| 2009/0228953 A1* | 9/2009 | Hu | H04L 12/1453 |
| | | | 726/1 |
| 2011/0276530 A1* | 11/2011 | Cutler | G06Q 10/10 |
| | | | 706/47 |
| 2013/0086237 A1* | 4/2013 | Cutler | H04L 41/0893 |
| | | | 709/223 |
| 2021/0103983 A1* | 4/2021 | Raleigh | H04M 15/00 |
| 2021/0377804 A1* | 12/2021 | Sivaraj | H04W 76/15 |
| 2022/0014963 A1* | 1/2022 | Yeh | G06N 3/045 |
| 2023/0107244 A1* | 4/2023 | Peng | H04W 24/08 |
| | | | 370/252 |
| 2023/0361958 A1* | 11/2023 | Sriram | H04W 72/23 |
| 2024/0259873 A1* | 8/2024 | Shete | H04W 24/02 |
| 2024/0259879 A1* | 8/2024 | Ranganath | H04L 41/5054 |

\* cited by examiner

FLEXIBLE EXPERT SYSTEM IN RADIO ACCESS NETWORK

CROSS-REFERENCE TO RELATED APPLICATION

This application is a national stage application of International Application No. PCT/US2022/051735, filed on Dec. 2, 2022, and designated the U.S., the entire contents of which are herein wholly incorporated by reference.

TECHNICAL FIELD

The present disclosure generally relates to a method and a system for managing radio resources optimally for a user equipment (UE), and more particularly relates to a wireless communication system based on operator defined rules.

BACKGROUND

Wireless communication is the transmission of information/data over a distance wirelessly. Generally, the information/data is in the form of voice telephone calls, data, text, images, etc. Further, the wireless transmission of data/information needs a base station where user equipment (UE) are connected to transmit and receive the data/information.

In the present scenario, various telecom operators have different frequency bands for transmission of data/information. Various operators define various strategies to manage subscribers spread across the different frequency bands. The strategies are generally prepared based upon the objectives/requirements/needs of the business.

Examples of various operator defined strategies are as follows:
- For user equipment (UE) that supports specific carrier aggregation band combinations are anchored in the specific CA bands.
- Use the bands that have maximum bandwidth for CA secondary cell (SCell) allocation to the UE.
- Initially admit UE in bands that have maximum bandwidth.
- For specific services like voice call/emergency call etc., steer the UE to bands that have better coverage so that voice call/emergency call does not drop even when the user keeps moving around.
- For UE that supports dual connectivity between Long-Term Evolution (LTE) and New Radio (NR) (5G), anchor the UE in LTE bands that are having dual connectivity pairing with NR bands.
- When selecting the NR band for dual connectivity pairing, prioritize the bands that have the maximum bandwidth in NR (for example, prefer a 100 MHz bandwidth carrier as against a 20 MHz bandwidth carrier).
- When serving cell is getting loaded, arm the UE with right measurements for neighbor cell so that early handover to the right neighbor cell is done to reduce the load on the serving cell. When doing such handover, the subscriber experience in the target cell shall be maintained (for example, if the subscriber is already viewing a video in the serving cell and is consuming heavy data, then after handover to the target cell the same video viewing experience should continue).
- When the UE is going to cell edge condition of a serving cell and if the UE is seeing more than one neighbor cell (across different frequencies), a strategy to select the best neighbor cell (or frequency layer) for handover to maintain the user experience is required.

It has been known in radio access networks (RAN), all the above strategies are managed by using a system that has a memory and a fixed set of codes (logic) defining the strategies for managing user equipment (UE). The fixed set of codes (logic) are generally baked into a RAN software, which are not customizable. In order to the customize the logic, the operator has to create multiple nested logics, which is almost like creating the logic from scratch. This process involves a great deal of time, professional skills and a delay in services to clients.

In some scenarios, the strategies are itself modelled as a decision tree. Further based on the configuration, a RAN software executes the strategy matching with a decision/trigger parameter/condition (e.g., On UE admission, on bearer admission for a specific QoS flow, UE release, etc.). Generally, the configuration tree grows in complexity to incorporate multiple operator strategies that in turn overloads the processing logic in the RAN software.

Various companies have created software that provide custom-defined solution within a closed RAN architecture. Such custom-defined solutions are inflexible and could not be adapted to operator needs. In the other extreme, in open RAN solutions as defined by O-RAN architectures, custom applications can be run on Near Real Time—RAN Intelligent Controller (Near-RT RIC) or Non-Real Time—RAN Intelligent Controller (Non-RT RIC). However, such software may require a separate Near-RT RIC/Non-RT RIC platform and a well-integrated software application. Further, such software may require a communication latency between the RAN function (eNodeB or gNodeB) and the Near-RT RIC/Non-RT RIC, which becomes an overhead.

Further, the software may require adaption, subsequent integration and testing with RAN network functions to create a balance between one operator requirements and the other operator requirements, which again is a complex task and may require a professional for the support.

Therefore, there is a need of a system and method to enable custom operator-defined strategy for managing the radio resources for user equipment (UE) in a wireless communication system. Further, the system and the method should be able to decouple the software logic of the radio resource management strategy from the wireless communication system software. Furthermore, the system and the method should enable a network operator to customize the radio resource management strategy through a rule engine as per their business needs via a configurable interface.

SUMMARY

In accordance with embodiments of the present disclosure, a method and a system of configuring custom operator defined rules for managing radio resources for user equipment in a wireless communication system.

An object of the present disclosure is to provide a method including: determining operator defined programmable rules to implement operator specific strategies for managing the user equipment; programming a rules engine with the operator defined rules; invoking the rule engine by a wireless network function on an occurrence of one or more defined events; and executing actions at the wireless network function, the actions corresponding to the operator defined rules.

Another object of the present disclosure is to provide the method and the system where the rules engine is an open source expert system. The rule definition language LISP, Python, Java, or any compatible domain specific language is used to program the rule engine. The operator defined rules correspond with one or more of: Radio Resource Management (RRM), UE admission, Bearer admission, QoS flow admission, Bearer release, QoS flow release, Mobility Handover (HO), Carrier Aggregation (CA), and Dual Connectivity (DC).

Another object of the present disclosure is to provide the method and the system where the wireless network function is at least one of an eNodeB, an eNodeB's Centralized Unit (CU), an eNodeB's Distributed Unit (DU), a gNodeB, a gNodeB's Centralized Unit (CU) and a gNodeB's Distributed Unit (DU). The one or more defined events includes at least one of User Equipment (UE) admission, bearer admission, UE release, cell loading and/or cell overloading, and UE reporting of a specific measurement report.

Another object of the present disclosure is to provide the method and the system where the CU and DU software is configured to invoke the rules engine upon the occurrence of the one or more defined events via an Application Programming Interface (API) call to the rules engine.

Another object of the present disclosure is to provide the method and the system that provides an inputs for the API calls to the rules engine include at least one of: a UE category, UE band capabilities, UE CA and dual connectivity band combinations, UE Radio Access Technology (RAT) Frequency Selection Priority ID (RFSP-ID), UE slice IDs, UE Quality of service (QOS) flows (QCI or 5QI), current serving cell load, frequency information of neighbor cells of the UE current serving cell, and neighbor cell load. Further, the inputs for the API calls are matched against the rules programmed in the rules engine to determine an action.

Another object of the present disclosure is to provide a wireless communication system having a plurality of User Equipment (UE), a plurality of wireless base stations configured to host Centralized Unit (CU) and Distributed Unit (DU) software, a rules engine, a first Application Programming Interface (API) wherein the rules engine is programmed with operator defined rules via the first API and a second API coupled with the CU and DU software and configured to invoke the rules engine upon an occurrence of one or more defined events, wherein one or more of the operator defined rules is invoked via API calls to execute operator defined rules that match one or more inputs provided by at least one of the CU and DU hosted by at least one of the plurality of base stations.

Another object of the present disclosure is an apparatus for programming operator defined rules to manage radio resources for user equipment in a wireless communication network, the apparatus having a memory configured to store a plurality of instructions, a processor circuitry coupled to the memory and configured to execute the plurality of instructions to receive the operator defined rules as programmable instructions, program a rules engine with the received instructions, invoke one or more of the operator defined rules via Application Programming Interface (API) calls to execute operator defined rules that match one or more inputs provided by a wireless network function and execute actions according to the one or more defined rules that match the one or more inputs.

DETAILED DESCRIPTION

Figure 1:
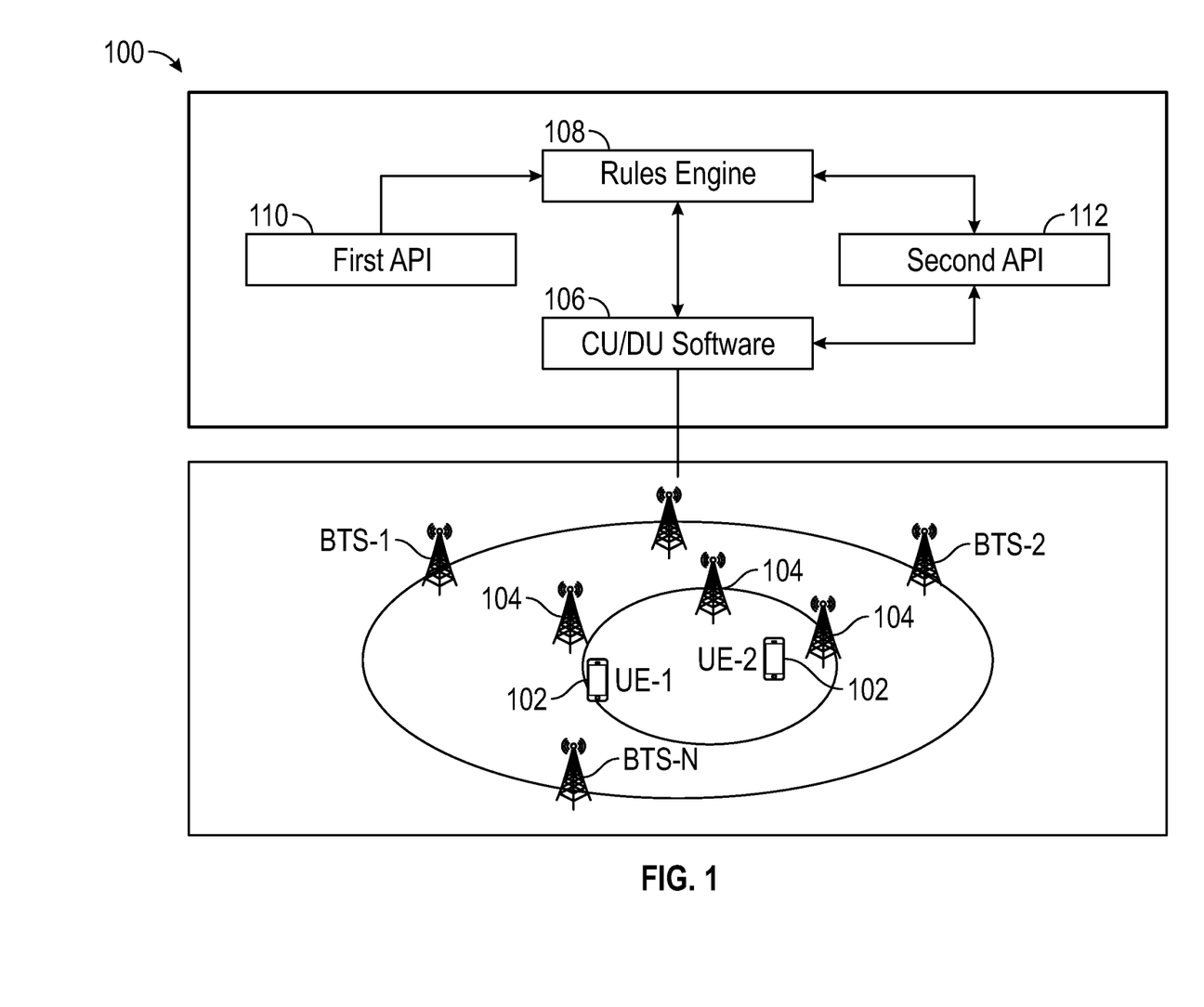
FIG. 1 illustrates a schematic diagram of a wireless communication system.

FIG. 1 illustrates a schematic diagram of a wireless communication system 100. The wireless communication system 100 includes a plurality of User Equipment (UE) 102, a plurality of wireless base stations 104 configured to host a Centralized Unit (CU) and Distributed Unit (DU) software 106, a rules engine 108, a first Application Programming Interface (API) 110 and a second API 112.

Examples of user equipment (UE) 102 includes but not limited to a communication device, smartphone, mobile phone, etc. The user equipment (UE) 102 are connected with the plurality of wireless base stations 104. Examples of the plurality of wireless base stations 104 includes but not limited to gNodeB, eNodeB, etc.

The Centralized Unit (CU) and Distributed Unit (DU) 106 is hosted by the plurality of wireless base stations 104 to manage the user equipment 102 in the wireless communication system 100. The Centralized Unit (CU) and Distributed Unit (DU) software 106 invokes and provides parameters to the rules engine 108.

The rules engine 108 is an open source expert system for processing/matching the parameters with the rules and provide an action/output to the Centralized Unit (CU) and Distributed Unit (DU) software 106. It would be readily apparent to those skilled in the art that various open source rule engines 108 such as CLIPS, PYKE, DROOLS, etc., may be envisioned without deviating from the scope of the present disclosure.

The rules engine 108 is programmed with operator defined rules via the first API 110. The rules engine 108 is programmed with the operator defined rules by using various programming language such as but not limited to LISP, Python, Java, etc. The operator defined rules are explained in detail in conjunction with FIG. 2 and FIG. 3 of the present disclosure.

The second API 112 is coupled with the CU and DU software 106 for providing the parameters to invoke the rules engine 108 upon an occurrence of one or more defined events. The one or more of the operator defined rules is invoked via the first API to execute operator defined rules that matches one or more inputs provided by at least one of the CU and DU software 106 hosted by at least one of the plurality of base stations 104.

Figure 2:
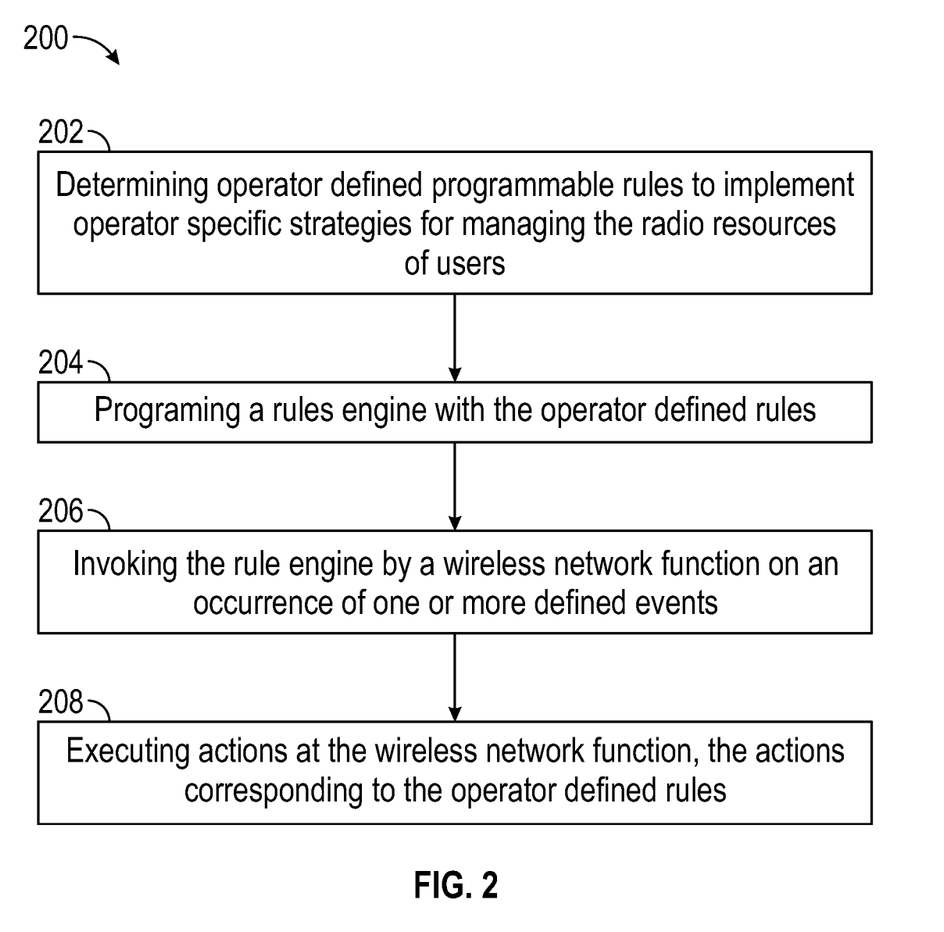
FIG. 2 illustrates a method of configuring custom operator defined rules for managing User Equipment (UE) in the wireless communication system.

FIG. 2 illustrates a method 200 of configuring custom operator defined rules for managing the radio resources of a User Equipment (UE) 102 in the wireless communication system 100. The method 200 discloses a block 202 for determining operator defined programmable rules to implement operator specific strategies for managing the User Equipment (UE) 102.

Further the method 200 discloses a block 204 for programming a rules engine with the operator defined rules. The operator defined rules correspond with one or more of Radio Resource Management (RRM), UE admission, Bearer admission, QoS flow admission, Bearer release, QoS flow release, Mobility, Handover (HO), Carrier Aggregation (CA), and Dual Connectivity (DC). The operator defined rules are explained in detail in conjunction with FIG. 3 of the present disclosure.

Further, the method discloses a block 206 for invoking the rule engine 108 by a wireless network function on an occurrence of one or more defined events. Furthermore, the method includes a block 208 for executing actions at the wireless network function, the actions corresponding to the operator defined rules. The events and the actions are explained in detail in conjunction with FIG. 3 of the present disclosure.

Figure 3:
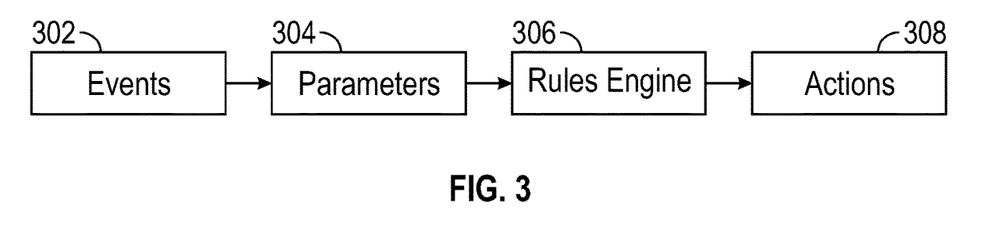
FIG. 3 illustrates a schematic diagram of process of managing radio resources for a UE through operator programmed rules in a wireless communication system.

FIG. 3 illustrates a schematic diagram of a process of managing the radio resources of a UE in a wireless communication system. The process is initiated when an event 302 is occurred. Examples of the event 302 include but not limited to User Equipment (UE) admission, bearer admission, UE release, cell loading and/or cell overloading, and UE reporting of a specific measurement report. It would be readily apparent to those skilled in the art that various types of event 302 may be envisioned without deviating from the scope of the present disclosure.

After the event 302 is occurred, the rules engine is invoked. The CU and DU software then provide parameters 304 for the operation of the rules engine. The parameters 304 are provided by using various programming language such as C, C++, Golang, Java, etc. Examples of the parameter 304 include but not limited to a UE category, UE band capabilities, UE CA and dual connectivity band combinations, UE Radio Access Technology (RAT) Frequency Selection Priority ID (RFSP-ID), UE slice IDs, UE Quality of service (QOS) flows (QCI or 5QI), current serving cell load, frequency information of neighbor cells of the UE current serving cell, and neighbor cell load.

The rules engine 306 receives the parameters 304 and matches against the operator defined rules. The operator defined rules correspond with one or more of Radio Resource Management (RRM), UE admission, Bearer admission, QoS flow admission, Bearer release, QoS flow release, Handover (HO), Carrier Aggregation (CA), Mobility and Dual Connectivity (DC).

The Radio Resource Management (RRM) is a system level management of co-channel interference, radio resources, and other radio transmission characteristics in wireless communication systems, for example cellular networks, wireless local area networks, wireless sensor systems, and radio broadcasting networks.

The Handover (HO) is a process of transferring an ongoing call or data session from one channel connected to the core network to another channel. The Carrier Aggregation (CA) is a feature of LTE-Advanced that allows mobile operators & devices to combine two or more LTE carriers into a single data change. It leads to an increase in the capacity of the network and the data rates by exploiting fragmented spectrum allocations.

The mobility in a wireless network basically refers to a node, Mobile Node (MN), or sometimes a subnet, changing its point of attachment to the network while its communication to the network remains uninterrupted. The Dual Connectivity (DC) allows a UE to simultaneously transmit and receive data on multiple component carriers from two serving nodes or cell groups (a master node, MN, and a secondary node, SN).

The rules engine 306 provide actions 308 to the CU and DU software based on the matches of the parameter 304 against the operator defined rules. Examples of the actions 308 include but not limited to Carrier Aggregation (CA) strategy, Dual connectivity (DC) strategy, Mobility strategy, Redirection strategy and Reselection strategy.

The Carrier Aggregation (CA) strategies are defined such as measurement strategy (e.g., Blind addition, A4 event only from UE, A1+A4 event from UE, A4+load etc.) and target frequencies and measurement configuration (threshold values for A4/A1 and other events as per strategy selected). The Dual connectivity (DC) strategies are defined such as measurement strategy (e.g., Blind addition, B1 event only from UE, A1+B1 event from UE, B1+load etc.) and Target frequencies, Measurement configuration (threshold values for B1/A1 and other events as per strategy selected).

The mobility strategies are defined such as measurement strategy for source cell (A1/A2), Source cell measurement thresholds (A1 threshold/A2 threshold), Target frequencies, Per target frequency measurement strategy (A3/A5/B1/B2) and Per target frequency measurement threshold (A3 threshold/A5 thresholds/B1 threshold/B2 threshold). The Redirect strategies are target frequencies and priority of each target frequency. The Reselection strategies are target frequencies, Priority of each target frequency and Sub priority for each target frequency.

Figure 4:
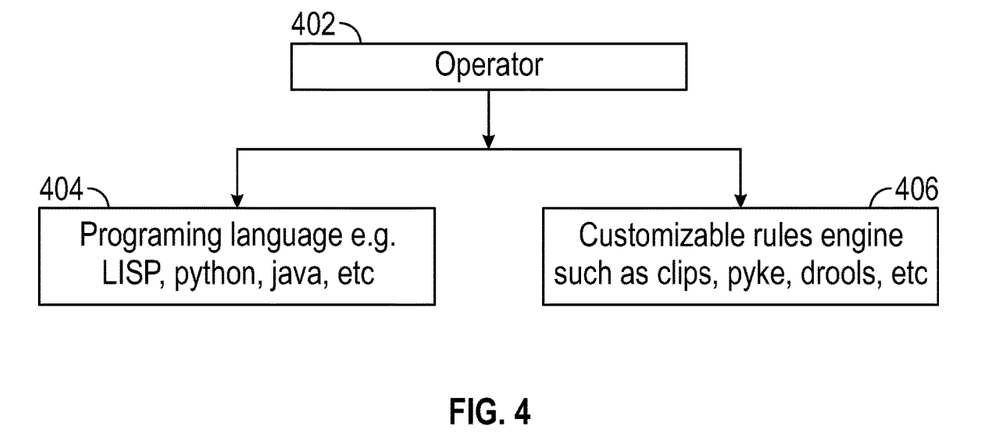
FIG. 4 illustrates a schematic diagram to showcase customization of operator defined rules in a rules engine.

FIG. 4 illustrates a schematic diagram to showcase customization of operator defined rules in a rules engine. Operator 402 defines rules or strategies based on some requirements/business needs. The rules engine 406 is programmable using various programming languages 404 such as LISP, Python, Java, etc.

There are various types of rules engine 406 available in the market such as CLIPS, PYKE, DROOLS, etc. The programming language 404 is used based on the type of the rules engine 406. For example, the CLIPS rule engine is programmed by using the LISP programming language. Similarly, the PYKE and DROOL rule engines are programed by using PYTHON and JAVA programming languages respectively. The rules engine 406 is flexible and is easily customized based on the operator 402 requirements.

Figure 5:
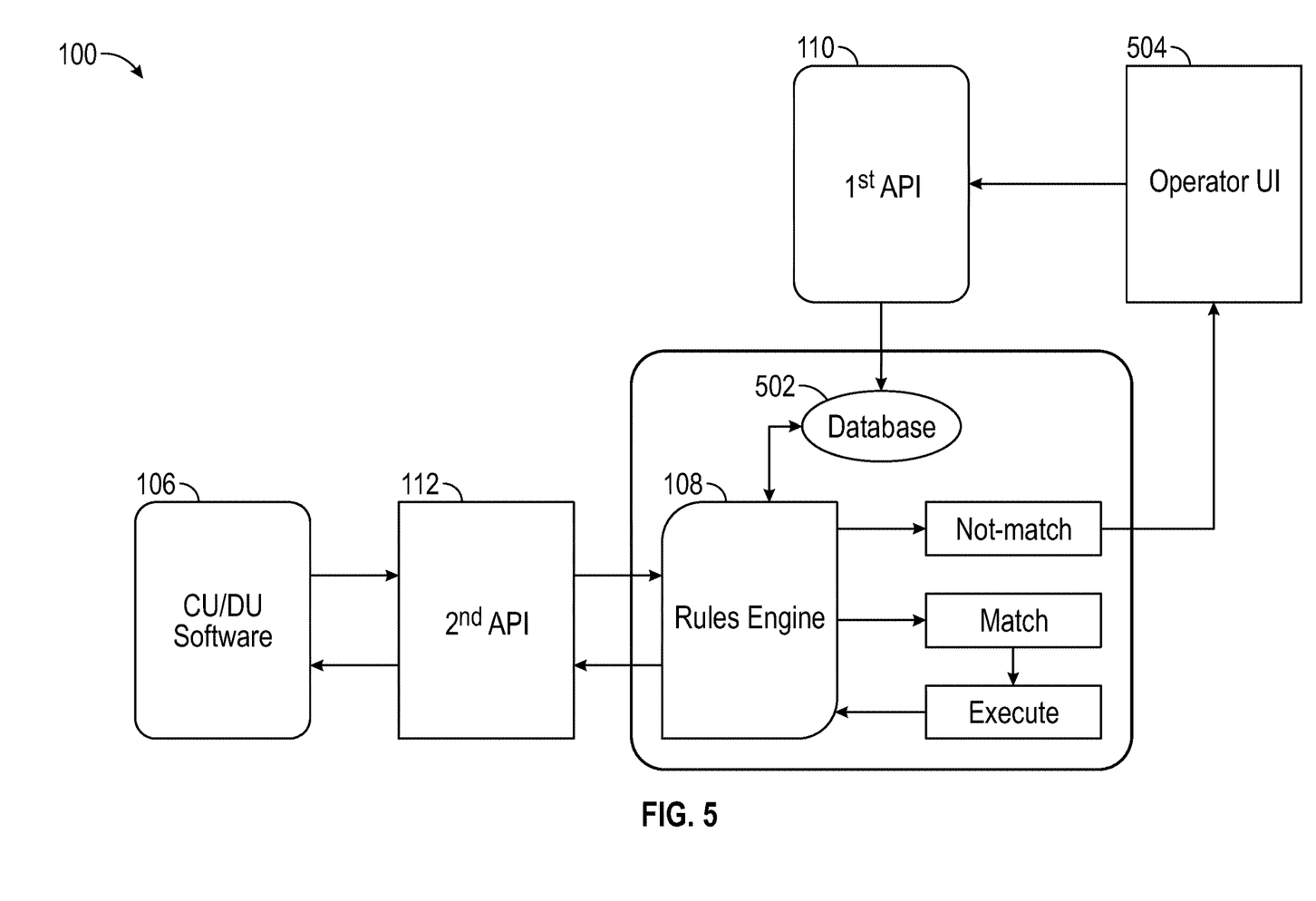
FIG. 5 illustrates a block diagram of a wireless communication system.

FIG. 5 illustrates a block diagram of a wireless communication system 100. The CU/DU software 106 is used for providing and getting one or more input/outputs from the rules engine 108 via the second API 112. The rules engine 108 process the strategies received from a database 502.

If the strategies are matched, the rules engine 108 executes action as per the defined strategies and provides the output to the CU DU software 106. If the strategies are not matched, the rules engine 108 sends feedback to an Operator UI 504. The Operator UI 504 is customizable using various languages as discussed in FIG. 1 to FIG. 4.

The Operator UI 504 re-strategizes and creates new/required strategies. The new strategies are then stored in the database 502 via the first API 110.

The present disclosure provides various advantage such as a highly flexible and scalable framework that allows any operator strategy to be programmed in the field deployment as rules that contain facts to match and actions to execute, enables rapid customization and experimentation to the operator, keeps the software implementation simple in the RAN software (CU and DU), keeps test effort minimal and pushes the responsibility of getting the rules and strategy for RRM, CA, DC, Mobility and HO to the operator instead of baking it in the software.

As described above, in one general aspect, a method of configuring custom operator defined rules for managing user equipment in a wireless communication system is provided. The method includes: determining operator defined programmable rules to implement operator specific strategies for managing the user equipment; programming a rules engine with the operator defined rules; invoking the rule engine by a wireless network function on an occurrence of one or more defined events; and executing actions at the wireless network function, the actions corresponding to the operator defined rules.

As described above, in another general aspect, a wireless communication system is provided. The wireless system includes: a plurality of User Equipment (UE), a plurality of wireless base stations configured to host Centralized Unit (CU) and Distributed Unit (DU) software, a rules engine, a first Application Programming Interface (API) wherein the rules engine is programmed with operator defined rules via the first API and a second API coupled with the CU and DU software and configured to invoke the rules engine upon an occurrence of one or more defined events, wherein one or more of the operator defined rules is invoked via API calls to execute operator defined rules that match one or more inputs provided by at least one of the CU and DU hosted by at least one of the plurality of base stations.

As described above, in another general aspect, an apparatus for programming operator defined rules to manage user equipment in a wireless communication network is provided. The apparatus includes: a memory configured to store a plurality of instructions, a processor circuitry coupled to the memory and configured to execute the plurality of instructions to receive the operator defined rules as programmable instructions, program a rules engine with the received instructions, invoke one or more of the operator defined rules via Application Programming Interface (API) calls to execute operator defined rules that match one or more inputs provided by a wireless network function and execute actions according to the one or more defined rules that match the one or more inputs.

Implementations of the method and the system may include one or more of the following features. In the method and the system, the rules engine is an open source expert system. The rule definition language LISP, Python, Java, or any compatible domain specific language is used to program the rule engine. The operator defined rules correspond with one or more of: Radio Resource Management (RRM), UE admission, Bearer admission, QoS flow admission, Bearer release, QoS flow release, Mobility Handover (HO), Carrier Aggregation (CA), and Dual Connectivity (DC). In the method and the system, the wireless network function is at least one of an eNodeB, an eNodeB's Centralized Unit (CU), an eNodeB's Distributed Unit (DU), a gNodeB, a gNodeB's Centralized Unit (CU) and a gNodeB's Distributed Unit (DU). The one or more defined events includes at least one of User Equipment (UE) admission, bearer admission, UE release, cell loading and/or cell overloading, and UE reporting of a specific measurement report. In the method and the system, the CU and DU software is configured to invoke the rules engine upon the occurrence of the one or more defined events via an Application Programming Interface (API) call to the rules engine. In method and the system that provides an inputs for the API calls to the rules engine include at least one of: a UE category, UE band capabilities, UE CA and dual connectivity band combinations, UE Radio Access Technology (RAT) Frequency Selection Priority ID (RFSP-ID), UE slice IDs, UE Quality of service (Qos) flows (QCI or 5QI), current serving cell load, frequency information of neighbor cells of the UE current serving cell, and neighbor cell load. Further, the inputs for the API calls are matched against the rules programmed in the rules engine to determine an action.

Other variations to the disclosed embodiments can be understood and effected by those skilled in the art in practicing the claimed features, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like acquiring, accessing, analyzing, capturing, comparing, determining, displaying, inputting, obtaining, outputting, providing, store or storing, calculating, simulating, receiving, warning, and stopping can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

What is claimed is:

1. A method of configuring operator defined rules for managing radio resources for user equipment (UE) in a wireless communication system, the method comprising:
    storing the operator defined rules for managing the UE in a database;
    determining operator defined programmable rules to implement the operator defined rules for managing the UE;
    programing a rules engine with the operator defined rules;
    invoking the rule engine by a wireless network function on an occurrence of one or more defined events;
    determining whether the operator defined rules are matched based on input from the wireless network function;
    when the operator defined rules are matched; and
    executing actions at the wireless network function, the actions corresponding to the operator defined rules;
    when the operator defined rules are not matched:
    sending feedback of a negative matching result.

2. The method according to claim 1, wherein the rules engine is an open source expert system.

3. The method according to claim 1, wherein a rule definition language is LISP, Python, Java, or any compatible domain specific language.

4. The method according to claim 1, wherein the operator defined rules correspond with one or more of: Radio Resource Management (RRM), UE admission, Bearer admission, QoS flow admission, Bearer release, QoS flow release, Mobility Handover (HO), Carrier Aggregation (CA), and Dual Connectivity (DC).

5. The method according to claim 1, wherein the wireless network function is at least one of an eNodeB, an eNodeB's Centralized Unit (CU), an eNodeB's Distributed Unit (DU), a gNodeB, a gNodeB's Centralized Unit (CU) and a gNodeB's Distributed Unit (DU).

6. The method according to claim 5, wherein the one or more defined events includes at least one of User Equipment (UE) admission, bearer admission, QoS flow admission, UE release, bearer release, QoS flow release, cell loading and/or cell overloading, and UE reporting of a specific measurement report.

7. The method according to claim 6, wherein CU and DU software is configured to invoke the rules engine upon the occurrence of the one or more defined events via an Application Programming Interface (API) call to the rules engine.

8. The method according to claim 7, wherein inputs for the API calls to the rules engine include at least one of: a UE category, UE band capabilities, UE CA and dual connectivity band combinations, UE Radio Access Technology (RAT) Frequency Selection Priority ID (RFSP-ID), UE slice IDs, UE Quality of service (QOS) flows (QCI or 5QI), current serving cell load, frequency information of neighbor cells of the UE current serving cell, and neighbor cell load.

9. The method according to claim 7, wherein inputs for the API calls are matched against the rules programmed in the rules engine to determine an action.

10. The method according to claim 1, when the operator defined rules are not matched, the method further comprising creating new operator defined rules and storing the new operator defined rules in the database.

11. A wireless communication system comprising:
a plurality of User Equipment (UE);
a plurality of wireless base stations configured to host Centralized Unit (CU) and Distributed Unit (DU) software;
a database configured to store operator defined rules;
a rules engine;
a first Application Programming Interface (API) wherein the rules engine is programmed with the operator defined rules via the first API; and
a second API coupled with the CU and DU software and configured to invoke the rules engine upon an occurrence of one or more defined events, wherein one or more of the operator defined rules is invoked via API calls to execute operator defined rules that match one or more inputs provided by at least one of the CU and DU hosted by at least one of the plurality of base stations, wherein feedback is sent to an operator interface when the operator defined rules do not match one or more inputs provided by at least one of the CU and DU hosted by at least one of the plurality of base stations.

12. The wireless communication system according to claim 11, wherein the plurality of base stations are a gNodeB or an eNodeB.

13. The wireless communication system according to claim 11, wherein the operator defined rules correspond with one or more of: Radio Resource Management (RRM), UE admission, Bearer admission, QoS flow admission, Bearer release, QoS flow release, Mobility Handover (HO), Carrier Aggregation (CA), and Dual Connectivity (DC).

14. The wireless communication system according to claim 13, wherein CU and DU software is configured to invoke the rules engine upon the occurrence of the one or more defined events via an Application Programming Interface (API) call to the rules engine, the one or more defined events including at least one of: User Equipment (UE) admission, bearer admission, UE release, cell loading and/or cell overloading, and UE reporting of a specific measurement report.

15. The wireless communication system according to claim 14, wherein inputs for the API calls to the rules engine include at least one of: a UE category, UE band capabilities, UE CA and dual connectivity band combinations, UE Radio Access Technology (RAT) Frequency Selection Priority ID (RFSP-ID), UE slice IDs, UE Quality of service (QOS) flows (QCI or 5QI), current serving cell load, frequency information of neighbor cells of the UE current serving cell, and neighbor cell load.

16. The wireless communication system according to claim 15, the inputs for the API calls are matched against the rules programmed in the rules engine to determine an action to be performed by the CU and DU.

17. The wireless communication system according to claim 11, when the operator defined rules do not match one or more inputs provided by at least one of the CU and DU hosted by at least one of the plurality of base stations, the system is configured to create new operator defined rules and store the new operator defined rules in the database.

18. An apparatus for programming operator defined rules to manage the radio resources of user equipment (UE) in a wireless communication network, the apparatus comprising:
a memory configured to store a plurality of instructions;
processor circuitry coupled to the memory and configured to execute the plurality of instructions to:
receive the operator defined rules as programmable instructions;
program a rules engine with the received programmable instructions;
invoke one or more of the operator defined rules via Application Programming Interface (API) calls to execute the operator defined rules that match one or more inputs provided by a wireless network function; and
execute actions according to the one or more defined rules that match the one or more inputs, wherein feedback is sent to an operator interface when the operator defined rules do not match the one or more inputs provided by at least one of the plurality of base stations.

19. The apparatus according to claim 18, wherein the network function is at least one of an eNodeB, an eNodeB's Centralized Unit (CU), an eNodeB's Distributed Unit (DU), a gNodeB, a gNodeB's Centralized Unit (CU) and a gNodeB's Distributed Unit (DU).

* * * * *